United States Patent [19]
McLemore

[11] Patent Number: 6,029,566
[45] Date of Patent: Feb. 29, 2000

[54] SMOKER GRILL BASE PAN WITH CHANNEL DESIGN

[76] Inventor: John C McLemore, 105 Hickory Ct., Fortson, Ga. 31808

[21] Appl. No.: 09/092,814

[22] Filed: Jun. 5, 1998

[51] Int. Cl.[7] ................................................... A47J 37/00
[52] U.S. Cl. .............................. 99/400; 99/401; 99/446; 99/447; 126/25 R; 126/41 R
[58] Field of Search .............................. 99/446, 447, 444, 99/400, 401, 482; 126/25 R, 41 R

[56] References Cited

U.S. PATENT DOCUMENTS 5,191,831   3/1993   Walden ......................... 99/446
5,528,982   6/1996   Chuang ......................... 99/446
5,555,795   9/1996   Tsai ........................... 99/447 X
5,768,977   6/1998   Parris et al. .................. 99/482 X Primary Examiner—Reginald L. Alexander
Attorney, Agent, or Firm—Smith, Gambrell & Russell, LLP

[57] ABSTRACT

An apparatus for improved heat circulation and containment when smoking or grilling using electric, gas, or charcoal as the heat source. The base design enhances heat containment, and offers a channel design in the bottom of the base pan. The strategically placed openings and legs add additional ventilation for improved air circulation.

22 Claims, 2 Drawing Sheets

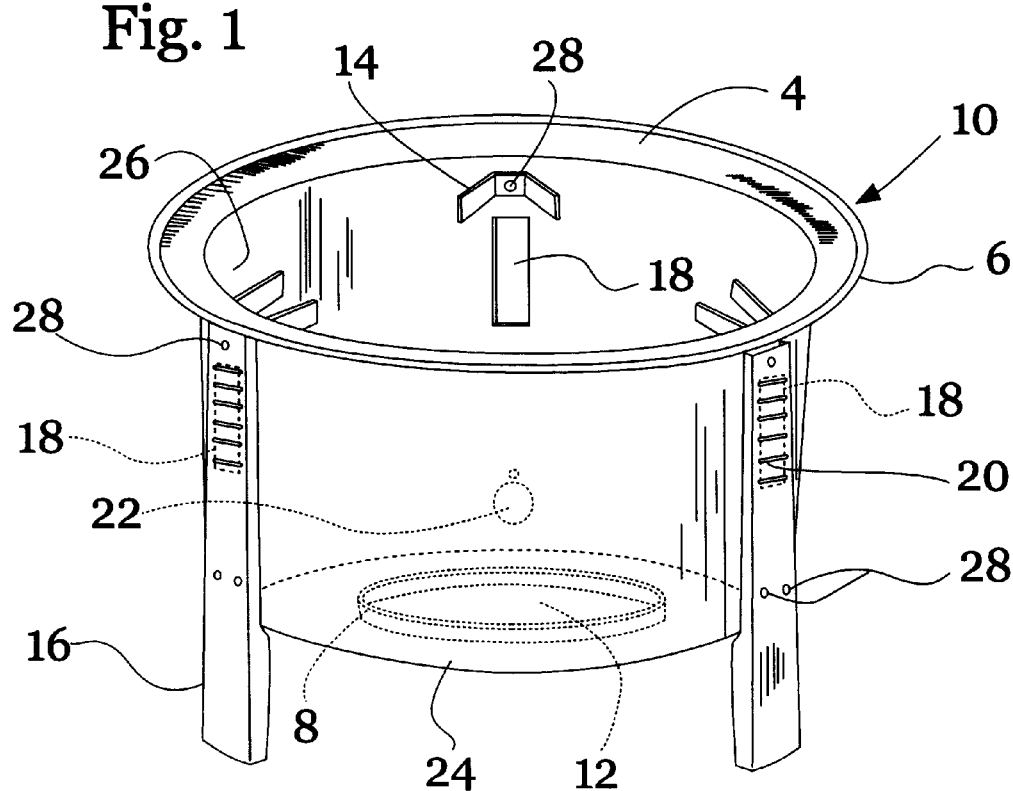
Fig. 1
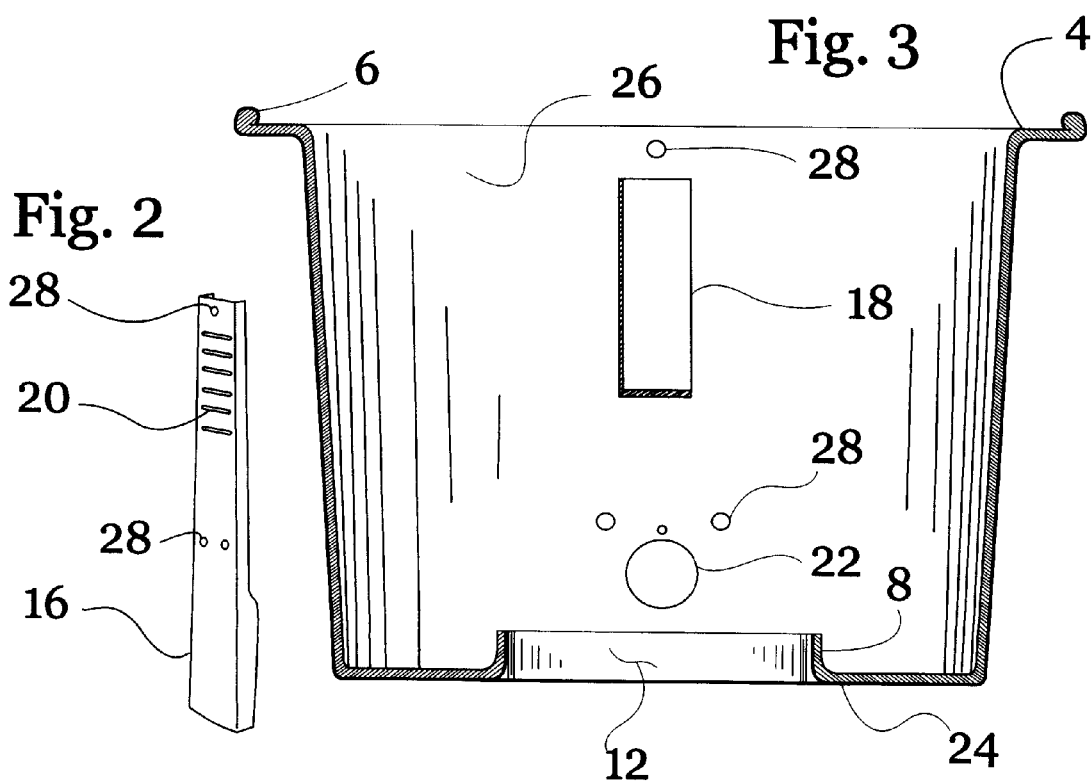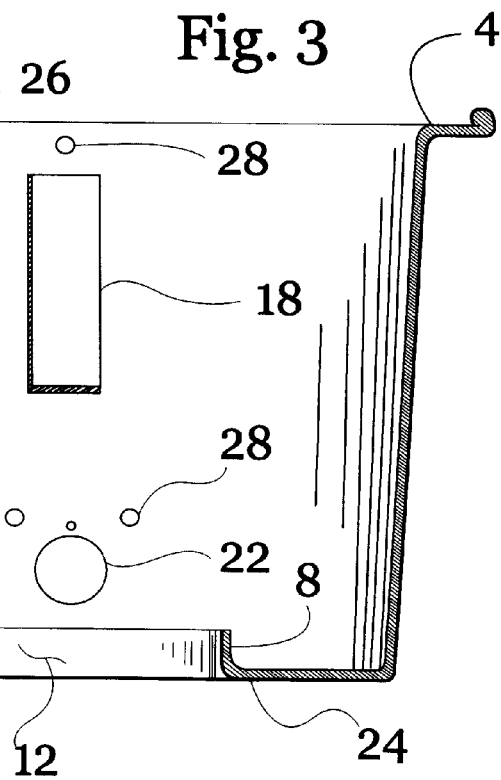
Fig. 2
Fig. 3

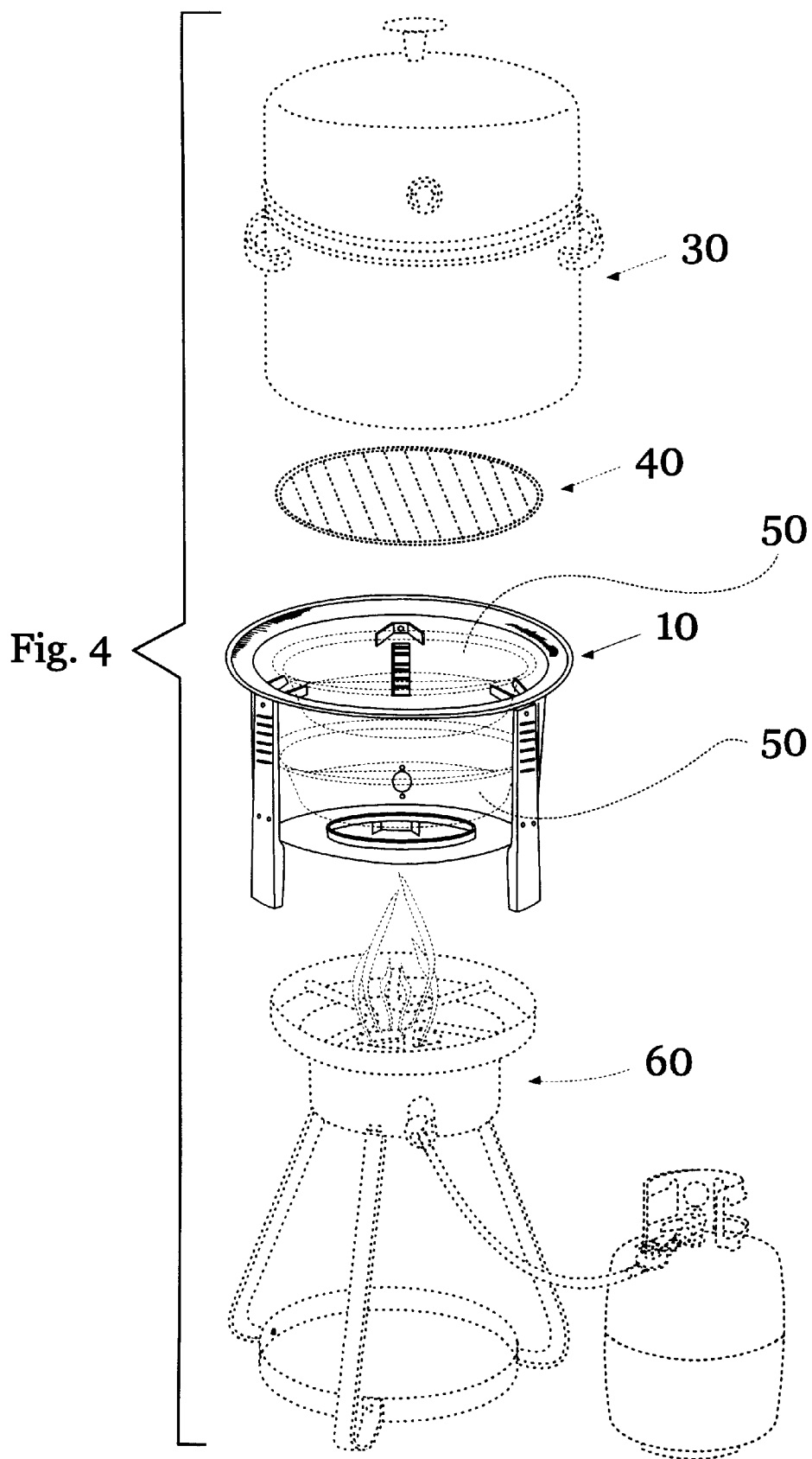

SMOKER GRILL BASE PAN WITH CHANNEL DESIGN

FIELD OF THE INVENTION

This invention relates generally to the field of outdoor cooking, and more particularly to an apparatus for improved heat circulation and containment, and which prevents food drippings from escaping when smoking or grilling using electric, gas, or charcoal as the heat source.

SUMMARY OF THE INVENTION

The primary object of the invention relates to a grill base design such as a base pan that allows for improved heat circulation and containment when smoking or grilling. The base pan design of the present invention enhances heat circulation and containment within the unit, and also offers a built in channel located in the bottom of the pan. The bottom of the base pan is designed with a large hole opening which creates a channel around the outside of the hole. This opening not only allows for improved air circulation, it is also positioned for the exterior gas flame to enter into the smoker or grill. In addition, the channel offers added protection against falling charcoal and ashes, which may fall from the bowl or plate inside the unit. Furthermore, the channel is designed to catch drippings from food. Adding water to the channel allows for easy clean-up and better condensation when water smoking.

Another object of the invention is its strategically placed air openings throughout the base pan. In addition to the opening at the bottom of the base pan, the base pan has holes for mounting legs and brackets, and a knockout hole when using an electric element. It also features three legs with vents that are designed to be placed over holes in the base pan located towards the top of the base pan.

The present invention features a base pan for smoking or grilling that comprises a main body having a bottom and side, with the side including a plurality of peripherally spaced apart vent openings. The base pan includes a plurality of legs each having an air vent, with the legs being secured to the main body so as to least partially cover respective vent openings provided in the main body such that there is air flow communication between said vent openings and corresponding air vents of said legs.

The base pan's legs each have a plurality of air vent apertures juxtaposed to the corresponding main body's air vent opening. In one embodiment, there are three legs circumferentially spaced about the side of said main body with each having a plurality of horizontal air vent slots that extend from side edge to side edge of the vent openings of the pan's main body. The legs are U-shaped in cross-section such that a channel is formed between an interior surface of each leg and an exterior surface of the side surface of the main body positioned below the corresponding vent opening in the main body.

The main body has an upper peripheral flange extending radially outward from the side of the main body and extending out over an upper opening in the channels formed by the legs. The flange has a rolled, peripheral upwardly extending edge. The legs have a covering section that extends over a full perimeter of the corresponding vent openings of the main body. The legs further include fastener holes and the side of the main body includes a plurality of leg fastening holes which are positioned in general vertical alignment with respective vent openings formed in the side, and the fastener and fastening holes are aligned so that the base pan can include a plurality of fasteners that extend through the fastener hole and fastening hole.

The base pan further comprises a plurality of grill rack brackets each having an attachment hole aligned with a fastener hole in a respective leg such that fasteners can extend through aligned fastener holes in the legs and fastening holes in the side and through attachment holes in the brackets.

An embodiment of the invention features a base pan wherein the bottom of the main body has a center opening, and wherein the center opening is defined by an edge extension extending upward off the bottom of the main body, which edge defines a bottom channel between the side of the main body and the edge extension. The embodiment of the invention also features an arrangement wherein the side and edge extension each extend vertically with the side extending vertically higher than the edge extension.

The base pan embodiment noted above can further include an electrical element knock out hole in the base pan side that is in general vertical alignment with one of the vent openings formed in the main body.

Thus, in one embodiment of the invention a base pan for smoking or grilling is provided having a main body with a bottom and a side wall, the side wall extending vertically upward from the bottom to an upper side wall end, the side wall including a plurality of peripherally spaced apart vent openings formed within the side wall below the upper side wall end and above the bottom. Also, a plurality of legs are secured to the main body, the bottom of the main body has a central opening, and the central opening and vent openings in the side wall are in air circulation communication so as to promote air circulation within the base pan during smoking or grilling. The central opening is defined by a vertically extending edge extension which forms an annular channel between the side wall and edge extension. The main body includes an upper flange extending radially out from the upper side wall end, and the legs have a leg section with air vents formed therein. The leg section is positioned over and covers a corresponding one of the vent openings in the main body. The leg sections have a U-shaped cross section with an outer wall and two side extensions, and the side extensions are in contact with the main body and the outer wall is spaced from the main body, and the leg section forms part of the outer wall. The noted embodiment features three vent openings in the side wall that are circumferentially spaced apart. Also, the base pan has each vent opening represented by a continuous peripheral vent edge that has all points lying on a common cylindrical surface.

In addition, the invention features a smoker grill assembly that includes a base pan that has a main body with a bottom and side, the side including a plurality of peripherally spaced apart vent openings. The base pan further comprises a plurality of legs each having an air vent, with the legs being secured to the main body so as to least partially cover respective vent openings provided in the main body such that there is air flow communication through the vent openings and corresponding air vents of the legs, and the base pan having a central opening in the bottom of the main body. The smoker grill assembly further includes a grill supported by the base pan, a covering body supported by the base pan and positioned so as to cover the grill, and a gas cooker having a flame producer which directs a flame though the central opening in the base pan.

Other objects and advantages of the present invention will become apparent from the following descriptions, taken in connection with the accompanying drawings. Wherein, by way of illustration and example, an embodiment of the present invention is disclosed.

The drawings constitute a part of this specification and include exemplary embodiments to the invention, which may be embodied in various forms.

BRIEF DESCRIPTION OF THE VIEWS OF THE DRAWINGS

FIG. 1: A perspective view of the smoker grill base pan with channel design.

FIG. 2: A perspective view of the base pan leg.

FIG. 3: A cross-sectional view of the smoker grill base pan with channel design.

FIG. 4: An exploded view showing a smoker grill assembly and where the smoker grill base pan with channel design is placed.

DETAILED DESCRIPTION OF THE INVENTION

A detailed description of a preferred embodiment of the invention is provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner.

In FIG. 1 there is shown base pan 10 having flat top edge 4 with rolled edge 6. FIG. 1 also provides a perspective view of the inside rolled edge 8 forming the channel. As shown in FIG. 1, rolled edge 8 defines raised center hole 12 in the base pan. Base pan 10 further comprises bracket 14 for holding the grill rack 40 (FIG. 4) and base pan legs 16 which extend over corresponding air vent holes formed in the side of base pan 10. In each base pan leg 16 there is provided a plurality of vented air holes 20 which provide a plurality of continuous air vent passageways in the base pan. FIG. 1 further illustrates knockout hole 22 for the placement of an electric element.

As shown FIGS. 1 and 3, base pan 10 includes bottom channel 24 positioned radially externally to inside rolled edge 8. Extending upwardly from the outer periphery of bottom channel 24 is side body 26 of the base pan within which is formed mounting holes 28 for legs and brackets.

FIG. 2 provides a perspective view of one base pan leg 16 in a detached state having a series of spaced vented air holes provided in the base pan legs 16 which air holes extend within the confines of air vent hole 18 when leg 16 is secured to side body 26 of base pan 10 by way of holes 28 for mounting legs and brackets. FIG. 2 also illustrates leg 16 as having a U-shaped cross-section that, as shown in FIG. 1, provides a vertical channel arrangement when the leg is mounted to side body 26.

FIG. 3 provides a cross-sectional view of the flat top edge 4 leading to rolled edge 6. FIG. 3 also shows a cross-sectional view of the inside rolled edge 8, forming the base pan's bottom channel 24, and channel hole 12 in the center of the base pan. FIG. 3 further illustrates the air vent hole 18 formed in the side of main body 26 of the base pan as well as holes 28 for mounting the legs and brackets.

FIG. 4 provides an exploded view of the smoker grill base assembly that illustrates base pan 10 and its relationship with respect to smoker body and dome 30, grill rack 40, water bowl 50, and gas cooker 60.

The above described invention thus provides an apparatus for improved heat circulation and containment, and which prevents food drippings from escaping when smoking or grilling using electric, gas, or charcoal as the heat source. The features of the described apparatus include:

A) The base pan offers improved heat containment.

B) The base pan is designed for improved air circulation.

C) The base pan has a built in channel in the bottom of the pan.

D) The base pan is designed with a large hole opening, which promotes air circulation, and creates the channel design.

E) The base pan is designed with strategically placed openings, and has detachable legs with vents that are placed over the openings.

F) The channel offers added protection against falling charcoal, ashes, and drippings.

G) The channel is designed for water placement, allowing easy clean-up and better condensation when water smoking.

H) The base pan has an interchangeable design, allowing the use of gas an electric element, or charcoal as the heat source.

I) The design of the base pan allows the use of an external gas burner and does not affect the bottom of the base pan.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A base pan for smoking or grilling, comprising:
   a main body having a bottom and side, said side including a plurality of peripherally spaced apart vent openings;
   a plurality of legs each having an air vent, said legs being secured to said main body so as to least partially cover respective vent openings provided in said main body such that there is air flow communication through said vent openings and corresponding air vents of said legs.

2. A base pan as recited in claim 1 wherein said legs each have a plurality of air vent apertures juxtaposed to a corresponding main body air vent opening.

3. A base pan as recited in claim 1 wherein there are three legs circumferentially spaced about the side of said main body each having a plurality of horizontal air vent slots that extend from side edge to side edge of corresponding vent openings of said main body.

4. A base pan as recited in claim 1 wherein said legs are U-shaped in cross-section such that a channel is formed between an interior surface of each leg and an exterior surface of a portion of the side of said main body positioned below the corresponding vent opening in said main body.

5. A base pan as recited in claim 4 wherein said main body has an upper peripheral flange extending radially outward from the side of said main body and extending out over an upper opening in the channels formed by said legs.

6. A base pan as recited in claim 1 wherein said legs have a covering section that extends over a full perimeter of the corresponding vent openings of said main body.

7. A base pan as recited in claim 1 wherein the legs include fastener holes and the side of said main body includes a plurality of leg fastening holes which are positioned in general vertical alignment with respect to vent openings formed in said side and in fastener reception alignment with respect to the fastener holes in said legs.

8. A base pan as recited in claim 7 further comprising a plurality of grill rack brackets having attachment holes aligned with the fastener holes in said legs such that fasteners can extend through aligned fastener holes in said legs and fastening holes in said side and through attachment holes in said brackets.

9. A base pan as recited in claim 1 wherein the bottom of said main body has a center opening.

10. A base pan as recited in claim 9 wherein said center opening is defined by an edge extension extending upward off the bottom of said main body which edge extension defines a bottom channel between the side of said main body and said edge extension.

11. A base pan as recited in claim 10 wherein said side and edge extension each extend vertically with said side extending vertically higher than said edge extension.

12. A base pan as recited in claim 11 wherein said main body has an upper peripheral flange extending radially outward from the side of said main body and said flange having a rolled peripheral upwardly extending edge.

13. A base pan as recited in claim 1 wherein said side further includes an electrical element knock out hole in general vertical alignment with one of the vent openings formed in the main body.

14. A base pan for smoking or grilling, comprising:
   a main body having a bottom and a side wall, said side wall extending vertically upward from said bottom to an upper side wall end, said side wall including a plurality of peripherally spaced apart vent openings formed within the side wall below the upper side wall end and above the bottom;
   a plurality of legs secured to said main body; and
   the bottom of said main body having a central opening, and said central opening and vent openings in the side wall together promoting air circulation within said base pan during smoking or grilling.

15. A base pan as recited in claim 14 wherein said central opening is defined by a vertically extending edge extension which forms an annular channel between said side wall and edge extension.

16. A base pan as recited in claim 15 wherein said main body includes an upper flange extending radially out from the upper side wall end.

17. A base pan as recited in claim 14 wherein said legs have a leg section with air vents formed therein.

18. A base pan as recited in claim 17 wherein the leg section of said legs is positioned over and covers a corresponding one of said vent openings in said main body.

19. A base pan as recited in claim 18 wherein said leg sections have a U-shaped cross section with an outer wall and two side extensions, and said side extensions being in contact with said main body and said outer wall being spaced from said main body, and the leg sections defining a part of the outer wall of each respective leg.

20. A base pan as recited in claim 14 wherein there are three vent openings in said side wall that are circumferentially spaced apart.

21. A base pan as recited in claim 14 wherein each vent opening is represented by a continuous peripheral edge that has all points lying on a common cylindrical surface.

22. A smoker grill assembly, comprising:
   a base pan that includes a main body having a bottom and side, said side including a plurality of peripherally spaced apart vent openings, said base pan further comprising a plurality of legs each having an air vent, said legs being secured to said main body so as to least partially cover respective vent openings provided in said main body such that there is air flow communication between said vent openings and corresponding air vents of said legs, and said base pan having a central opening in the bottom of said main body;
   a grill supported by said base pan;
   a covering body supported by said base pan and positioned so as to cover said grill;
   a gas cooker having a flame producer which directs a flame though the central opening in said base pan.

* * * * *